United States Patent Office 2,769,139
Patented Oct. 30, 1956

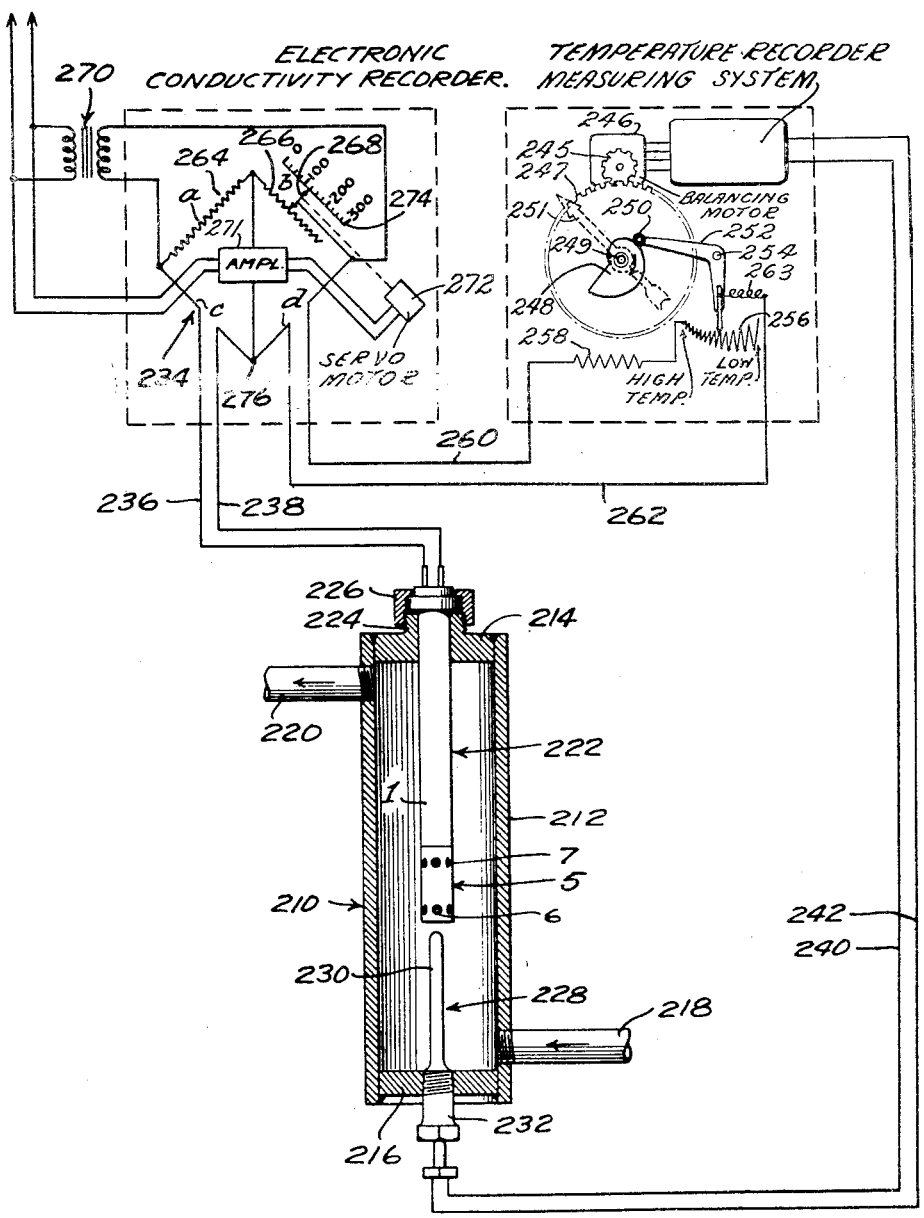

2,769,139

MEANS FOR MEASURING ELECTRICAL CONDUCTIVITY OF LIQUIDS

David Noel Obenshain, Piedmont, W. Va., assignor to West Virginia Pulp and Paper Company, New York, N. Y., a corporation of Delaware Original application March 26, 1952, Serial No. 278,661. Divided and this application May 11, 1953, Serial No. 354,939

6 Claims. (Cl. 324—30)

This invention relates to means for measuring the conductivity of liquids, the present application being a division of my application Serial No. 278,661, filed March 26, 1952.

The invention has been devised primarily for the determination of the concentration of solutions used in chemical processes and subject to depletion, for example, the cooking of wood chips in paper making. In certain cooking processes it is important that the cooking liquor be maintained at a substantially uniform concentration in order that a uniform pulp may be produced.

In accordance with the present invention, advantage is taken of the fact that the electrical conductivity of a solution is a function of its concentration. If other variables can be eliminated or compensated, the concentration of a solution may be determined by measuring its conductivity.

As broadly stated above, the proposal to utilize conductivity measurement for the maintenance of a desired concentration of solution is not new. In the only prior attempt along this line with which I am familiar, however, conductivity cells were utilized which were crude and unsatisfactory and a method of temperature compensation was employed which was inadequate. A chief problem to which the present invention is addressed is to make the indications of the conductivity cell exclusively a function of conductivity.

Change of temperature has a greater effect upon the conductivity of a solution than does change of concentration. The conductivity of a solution is a measure of its ability to conduct electrons, and in the case of sulfate cooking liquor is dependent upon the number and mobility of the $Na^+$, $OH^-$, and $SH^-$ ions in the liquor. Little ions such as $OH^-$ move fast. Big ions such as $Na^+$ and $SH^-$ do not move as fast as the $OH^-$ ions. In addition, these big ions carry shells of water molecules which increase their size and lower their mobility. This phenomenon is known as solvation. The degree of solvation is a function of the temperature and decreases as temperature increases, with a consequent increase in the mobility of the ions. The viscosity of water also decreases as the temperature increases. As a result, there is approximately a two percent increase in conductivity for each degree centigrade increase in temperature.

It is a primary object of the present invention to provide practical temperature compensation means so that conductivity measurements may be obtained which are a true index of concentration.

In accordance with the form of temperature compensation device according to the present invention, it is a feature that a thermocouple exposed to the temperature of the test liquor is caused to generate a voltage which is a function of temperature, this voltage, linearly amplified, being utilized to drive mechanism for changing the resistance of a variable resistor. The drive mechanism and the resistor are devised to cause the conductivity of the resistor to be varied with temperature in harmony with the known law of variation with temperature of the conductivity of the test liquor when maintained uniformly at the standard concentration. By balancing the resistor, thus affected by temperature, against a reference cell containing test liquor and similarly varied by temperature in a Wheatstone bridge apparatus, an unbalance is obtained which may be utilized for (1) giving a visual indication of the percentage concentration of the liquor as compared to standard concentration, or (2) operating a recorder which graphically shows a continuous record of the percentage concentration of the test liquor as compared to standard concentration, or (3) operating corrective mechanism for supplying concentrated make-up liquor as required, or for performing any two or more of the enumerated functions.

Other objects and advantages will hereinafter appear.

In the drawing forming part of this specification, the single figure is a view of a form of temperature compensated concentration measuring apparatus according to the present invention and employing a temperature actuated variable resistor as the compensating means.

In the form of mechanism illustrated in this application a casing 210 is provided consisting of a tubular body part 212 and upper and lower end closure plugs 214 and 216, through which hot liquor is diverted from the digester or other associated chamber in which the liquor is employed. The liquor is introduced into the casing near the bottom of the casing through a conduit 218 and flows out from the top through a conduit 220, being returned to the digester by the latter conduit.

A conductivity cell 222 like the cell of Figs. 1 to 3, of my parent application Serial No. 278,661, is introduced into the casing 210 from above, being secured to the casing through a threaded boss 224 on the plug 214 and a union coupling 226. A low mass thermocouple 228 is introduced into the opposite end of the casing 210 through the plug 216. The thermocouple is desirably of a well known type employing iron and constantan in contact with one another and having the hot joint enclosed within a metallic bulb 230. The bulb 230 is made unitary with a larger diameter externally threaded fitting 232 which is screwed tightly into the plug 216 to provide a sealed joint. It will be observed that the hot junction of the thermocouple and the conductivity cell are maintained at the same temperature, both being exposed to the temperature of the liquor which flows continuously from the digester through the small casing 210 and back to the digester again. There is no substantial temperature lag.

The conductivity cell is included in the arm $c$ of a Wheatstone bridge apparatus 234 through conductors 236 and 238. The resistance of the arm $c$ is, therefore, subject to change with change of temperature and with change of liquor concentration. The thermocouple 228 is connected to a standard commercial temperature recorder 244 of well-known design. The recorder 244 includes a potentiometer, not shown, and a balancing motor 246. At the potentiometer, the voltage generated by the thermocouple 228 is compared with a standard voltage furnished from a fixed voltage source. The balancing motor 246 controls the potentiometer slide and itself responds to any out of balance voltage at the potentiometer, to restore balance. The rotative position of the cam 248 driven by the motor shaft is a function of the voltage generated by the thermocouple, and hence of the temperature of the thermocouple.

The balancing motor 246, through gears 245 and 247, drives a shaft 249 upon which a cam 248 and a temperature indicator 251 are made fast. The cam 248 acts upon a follower 250 which is carried at the end of one arm of a bellcrank 252. The bellcrank 252 is pivoted at 254. Its second arm, which is conductive, serves as a sliding conductive contact in engagement with a taper wound resistor 256. The cam 248 is desirably designed to cause the bellcrank 252 to move approximately equal angular distances for equal increments of temperature. The resistor 256 is then taper wound in a manner to cause its resistance to change with temperature in accordance with the law which governs the resistance of the conductivity cell when using the test solution at standard concentration, i. e., at low temperatures the resistors have to have relatively great resistance changes per unit change in temperature, while at high temperatures this change per unit change in temperature is quite small. The resistor 256 is connected in series with a fixed resistor 258, and these resistors are included in the arm $d$ of the Wheatstone bridge apparatus 234 through conductors 260, 262 and 263. The cam 248 may be exactly tailored to match irregularities in the resistor 256 as well as the specific characteristics of the liquid being measured.

The cam 248 and the resistor 256 may be varied in other ways, as desired, so long as the desired law of variation of resistance of the arm $d$ with temperature of the test solution is obtained.

The cam 248 is readily removable and replaceable in the apparatus, being secured upon the shaft 249 by a hand nut (not shown) so that cams of different contours can be provided for different solutions that may be employed.

The conductivity indicator assembly 234 contains two legs of a Wheatstone bridge circuit comprising fixed resistor 264 as leg $a$, slidewire 266 and slidewire contactor 268 as leg $b$, a transformer 270 for supplying current to the bridge circuit, a bridge unbalance detector-amplifier-motor controller 271, a bridge balancing motor 272, and an indicator scale 274. The indicator assembly 234 may also be equipped with recorder and controller equipment of conventional design not shown here. Conductivity cell 222 as previously mentioned forms leg $c$ of the Wheatstone bridge, while resistance 256 in the temperature compensator forms leg $d$. As explained in connection with Fig. 4 of my parent application any unbalance of the bridge circuit causes motor 272 to readjust the position of slidewire contactor 268 until balance is restored. Motion of this slidewire contactor is indicated on indicator scale 274 which may be calibrated in any desired terms of conductivity or concentration. It will thus be observed that any change in conductivity due to change in concentration is compensated for by a relocation of the slidewire contactor and indicating pointer while any change in conductivity due to change in temperature is compensated for by change in value of temperature compensating resistor 256.

While certain preferred embodiments of the invention have been illustrated and described in detail, it is to be understood that changes may be made therein and the invention embodied in other structures. It is not therefore the invention to limit the patent to the specific constructions illustrated, but to cover the invention broadly in whatever form its principles may be utilized.

I claim:

1. Apparatus for determining the concentration of a solution through conductivity measurement comprising in combination a Wheatstone bridge, a conductivity cell employing the test solution in one arm of the bridge, a variable resistor comprising a winding and a wiper included in a second arm of the bridge, temperature responsive means exposed to the temperature of the test solution and mechanism responsive to the temperature responsive means constructed and arranged to vary the resistance of the variable resistor with temperature in accordance with the known law of variation of resistance with temperature of the test solution at standard concentration, a fixed resistance in a third arm of the bridge, an adjustable resistance in the fourth arm of the bridge, means for adjusting the last mentioned resistance to restore bridge balance, and means responsive to said adjusting means for indicating the concentration of the solution.

2. Apparatus as claimed in claim 1 in which the variable resistor is taper-wound and the wiper movement is approximately proportional to temperature change.

3. Apparatus for determining the concentration of a solution through conductivity measurement comprising in combination a Wheatstone bridge, a conductivity cell employing the test solution in one arm of the bridge, a variable resistor comprising a winding and a wiper included in a second arm of the bridge, a thermocouple exposed to the temperature of the test solution, and mechanism responsive to the thermocouple for varying the resistance of the variable resistor with temperature in accordance with the known law of variation of resistance with temperature of the test solution at standard concentration, a fixed resistance in a third arm of the bridge, an adjustable resistance in the fourth arm of the bridge, means for adjusting the last mentioned resistance to restore bridge balance, and means responsive to said adjusting means for indicating the concentration of the solution.

4. Apparatus as claimed in claim 3 in which the mechanism responsive to the thermocouple comprises an amplifier, a motor responsive to the amplifier output, and a wiper operating mechanism, between the motor and the wiper, constructed and arranged to make the wiper movement upon the resistor such as to provide temperature compensation in accordance with the known law of variation of resistance of the test solution at standard concentration with temperature, said mechanism having a readily replaceable element to permit adaption to, and exact matching of, the particular solution being tested.

5. In an apparatus for determining the concentration of a solution through conductivity measurement, mechanism providing a standard reference resistance variable with temperature in accordance with the known law of variation of resistance with temperature of the test solution at standard concentration, said mechanism comprising, in combination, a resistance winding, a wiper cooperative therewith, a thermocouple adapted to be made responsive to the temperature of the test solution, an amplifier responsive to the thermocouple, and mechanical wiper operating means responsive to the amplifier output, the construction and arrangement being such that the resistance of the said winding is caused to vary with temperature as set forth.

6. Apparatus for measuring the resistance of a solution and converting such measurement into an indication of concentration of the solution notwithstanding temperature variations of the solution comprising, in combination, a self-balancing Wheatstone bridge, a conductivity cell employing the test solution in one arm of the bridge, a variable resistor in a second arm of the bridge, a temperature sensing element subjected to the same temperature as the conductivity cell, a temperature measuring device connected to the temperature sensing element, means responsive to the temperature measuring device to vary the resistance of the variable resistor in accordance with the known law of variation of resistance with temperature of the test solution at standard concentration, a fixed resistance in a third arm of the bridge, an adjustable resistance in the fourth arm of the bridge, means responsive to an out of balance condition for automatically adjusting the last mentioned resistance to restore bridge balance, and means responsive to said adjusting means for indicating the concentration of the solution.

References Cited in the file of this patent

UNITED STATES PATENTS

| | | |
|---|---|---|
| 2,549,621 | Moore | Apr. 17, 1951 |
| 2,667,608 | Sideman | Jan. 26, 1954 |